(12) United States Patent
Vigna

(10) Patent No.: US 6,404,599 B1
(45) Date of Patent: Jun. 11, 2002

(54) HIGH-PERFORMANCE INTEGRATED MICROACTUATOR, PARTICULARLY FOR A HARD DISK READ/WRITE TRANSDUCER

(75) Inventor: Benedetto Vigna, Pietrapertosa (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/409,584

(22) Filed: Sep. 30, 1999

(30) Foreign Application Priority Data

Sep. 30, 1998 (EP) .......................................... 98830573

(51) Int. Cl.[7] ............................. G11B 21/24; G11B 5/56
(52) U.S. Cl. .................................................... 360/294.1
(58) Field of Search .................................. 360/260, 264, 360/264.1, 264.3, 265.1, 266.2, 245, 245.3, 245.4, 270, 274, 290, 294, 294.1, 294.6, 244, FOR 209

(56) References Cited

U.S. PATENT DOCUMENTS

| | | | |
|---|---|---|---|
| 3,789,378 A | 1/1974 | Bonzano et al. | 340/174.1 |
| 4,065,677 A | 12/1977 | Micheron et al. | 307/112 |
| 4,827,162 A | * 5/1989 | Morris et al. | 310/13 |
| 5,025,346 A | 6/1991 | Tang et al. | 361/283 |
| 5,151,763 A | 9/1992 | Marek et al. | 357/26 |
| 5,216,631 A | 6/1993 | Sliwa, Jr. | 365/174 |
| 5,233,213 A | 8/1993 | Marek | 257/415 |
| 5,428,259 A | 6/1995 | Suzuki | 310/309 |
| 5,438,469 A | 8/1995 | Rudi | 360/291 |
| 5,477,097 A | 12/1995 | Matsumoto | 310/309 |
| 5,521,778 A | 5/1996 | Boutaghou et al. | 360/264.5 |
| 5,631,514 A | 5/1997 | Garcia et al. | 310/294.3 |
| 5,657,188 A | 8/1997 | Jurgenson et al. | |

FOREIGN PATENT DOCUMENTS

| | | |
|---|---|---|
| EP | 0 482 205 A1 | 4/1992 |
| EP | 0 533 095 A2 | 3/1993 |
| EP | 0 578 228 A3 | 1/1994 |
| EP | 0 578 228 A2 | 1/1994 |
| EP | 0 613 124 A2 | 8/1994 |
| EP | 0 840 291 A2 | 5/1998 |
| EP | 0991175 A1 * | 4/2000 |
| JP | 07-177773 | 7/1995 |
| WO | WO 93/21536 | 10/1993 |
| WO | WO 95/34943 | 12/1995 |

OTHER PUBLICATIONS

Tang et al., "Laterally Driven Polysilicon Resonant Microstructures,"*Sensors and Actuators*. (20):25–32, Nov. 15, 1989.

Starr, "Squeeze–Film Damping in Solid–State Accelerometers," *IEEE Solid–State Sensor an Actuator Workshop*, pp. 44–47, Jun. 1990.

Gianchandani et al., "Batch Fabrication and Assembly of Micromotor–Driven Mechanisms With Multi–Level Linkages," *Micro Electro Mechanical Systems*, IEEE, pp. 141–146, Feb. 1992.

(List continued on next page.)

Primary Examiner—Robert S. Tupper
Assistant Examiner—Julie Anne Watko
(74) Attorney, Agent, or Firm—Lisa K. Jorgenson; Robert Iannucci; Seed IP Law Group

(57) ABSTRACT

A microactuator comprises a stator element and a rotor element which are capacitively coupled. The rotor element comprises a suspended mass and a plurality of movable drive arms extending radially from the suspended mass and biased at a reference potential. The stator element comprises a plurality of first and second fixed drive arms associated with respective movable drive arms and biased at a first drive potential. A mechanical damping structure is formed by at least one movable damping arm extending radially from the suspended mass and by at least one first and one second fixed damping arm associated with the movable damping arm and biased at said reference potential, to dampen settling oscillations of the rotor element.

15 Claims, 4 Drawing Sheets

OTHER PUBLICATIONS

Lee et al., "Polysilicon Micro Vibromotors," *Micro Electro Mechanical Systems*, IEEE, pp. 177–182, Feb. 4–7, 1992.

Fujita et al., "Position Control of An Electrostatic Linear Actuator Using Rolling Motion," *Mechatronics*, vol. 2, No. 5, pp. 495–502, Oct. 1992.

Zhang et al., "Viscous Air Damping in Laterally Driven Microresonators," *IEEE Workshop No. 7*, pp. 199–204, Jan. 25, 1994.

Fan et al., "Magnetic Recording Head Positioning at Very High Track Densities Using a Microactuator–Based, Two–Stage Servo System," *Transactions on Industrial Electronics*, IEEE, 42(3):222–233, Jun. 1995.

Moesner et al, "Electrostatic Devices For Particle Micro–Handling," IEEE, pp. 1302–1309, 1995.

Imamura et al., "Transverse Mode Electrostatic Microactuator For MEMS–Based HDD Slider," IEEE, pp. 216–221, 1996.

Horsley et al., "Angular Micropositioner For Disk Drives," IEEE MEMS '97 Workshop Nagoya, Japan.

Veijola et al., "Model for Gas Film Damping in a Silicon Accelerometer," 1997 International Conference on Solid–State Sensors and Actuators, pp. 1097–1100, Jun. 16–19, 1997.

Pannu et al., "Accelerometer Feedforward Servo For Disk Drives." Presented at the Advanced Intelligent Mechatronics–International Conference, Tokyo, Japan, Jun. 1997.

Aggarwal, "Design and Control of Micro–Actuators For High Density Disk Drives," Thesis Graduate Division—University of California at Berkeley, May 1997.

Aggarwal et al., "Micro–Actuators For High Density Disk Drives," American Control Conference, 1997.

Peter Mee et al, "Only Clean Drives Are Good Drives," *Data Storage*, pp. 77–80, Sep., 1997.

* cited by examiner

US 6,404,599 B1

HIGH-PERFORMANCE INTEGRATED MICROACTUATOR, PARTICULARLY FOR A HARD DISK READ/WRITE TRANSDUCER

TECHNICAL FIELD

The present invention relates to a high-performance integrated microactuator. In particular, the integrated microactuator according to the present invention is advantageously but not exclusively used for actuation of hard disk read/write transducers, to which the discussion below will make explicit reference without thereby losing generality.

BACKGROUND OF THE INVENTION

Integrated microactuators have recently been proposed in hard disk actuating devices provided with a dual actuation stage, wherein a first actuation stage performs a coarse drive of a read/write (R/W) transducer during tracking and a second actuation stage performs a finer position control of the R/W transducer.

An example of a hard disk actuating device 1 with a dual actuation stage is shown diagrammatically in FIGS. 1 and 2. In detail, in FIG. 1, the hard disk actuating device 1 comprises a motor 2 (also called a "voice coil motor") to which at least one suspension 5 formed by a lamina is fixed in a projecting manner. At its free end, the suspension 5 has an RW transducer 6 (see, e.g., FIG. 2), also known as a "slider" and disposed (when in an operating condition) facing a surface of a hard disk 7 (see, e.g., FIG. 1). The R/W transducer 6 is fixed to a coupling, known as a gimbal 8, via a microactuator 9 interposed between the gimbal 8 and the R/W transducer 6 (see, e.g., FIG. 2). On one of its lateral surfaces, the R/W transducer 6, formed by a body of ceramic material (such as AlTiC), further has a read/write head 10 (magneto/resistive and inductive) which forms the actual read/write device.

In the actuating device 1, the first actuation stage is defined by motor 2 that moves the unit formed by suspension 5 and R/W transducer 6 across the hard disk 7 during track seeking, and the second actuation stage comprises the microactuator 9 that finely controls the position of the R/W transducer 6 during tracking.

An embodiment of a microactuator 9 of a rotary electrostatic type is shown schematically in FIG. 3, wherein microactuator 9 is shown only in part, given its axial symmetry. The microactuator 9 comprises an external stator 17, integral with a die embedding the microactuator 9 and bonded to the gimbal 8, and an internal rotor 11, intended to be bonded to the R/W transducer 6 (see, e.g., FIG. 2) and capacitively coupled to the stator 17.

The rotor 11 comprises a suspended mass 12 of substantially circular shape and a plurality of movable arms 13 extending radially towards the outside from the suspended mass 12. Each movable arm 13 has a plurality of movable electrodes 14 extending in substantially circumferential direction and equidistant from each other. The rotor 11 further comprises anchoring and elastic suspension elements (shown as springs 15) elastically connecting the suspended mass 12 to fixed anchoring regions 16 that bias the rotor 11 and the movable electrodes 14 at a reference potential.

The stator 17 comprises a plurality of fixed arms 18a, 18b extending radially with respect to the suspended mass 12 from fixed biasing regions 20a, 20b arranged circumferentially around the rotor 11 and each fixed arm 18a, 18b having a plurality of fixed electrodes 19. In particular, a pair of fixed arms formed by a fixed arm 18a and a fixed arm 18b is associated with each movable arm 13. The fixed electrodes 19 of each pair of fixed arms 18a, 18b extend towards the associated movable arm 13 and are intercalated or interleaved with the movable electrodes 14. All the fixed arms 18a are disposed on a same side of the respective movable arms 13 (e.g., on the right side in the example shown in FIG. 3) and are all biased at a same first drive potential through bias regions 20a. Similarly all the fixed arms 18b are arranged on the other side of the respective movable arms 13 (e.g., on the left side in the example shown in FIG. 3) and are all biased at a same second drive potential through the bias regions 20b.

The fixed arms 18a and the fixed arms 18b are biased at different drive potentials which differ from the reference potential of rotor 11 so as to generate two different potential differences with respect to the movable arms 13 and to cause the rotor 11 to rotate in one direction or the other.

Materials currently used to manufacture the microactuator 9 are substantially of two types: brittle materials, such as single or multi-crystal silicon, which are elastically but not plastically deformable, and ductile materials such as nickel that are plastically deformable.

Specific assessments of the energy dissipation capacity of these materials, the obtainable reliability, and the effects of their use on the final quality control process of the finished product cause silicon to be chosen as the structural material. In fact, the use of silicon enables microstructures to be produced which are more reliable than if metals are used, with considerable simplifications to the final quality control process of the finished product.

On the other hand, silicon microactuators have a damping factor that is much worse than metals. In fact, a microactuator of silicon may be modelled by means of a second order differential equation defined, inter alia, by a damping factor, or alternatively, by a quality factor inversely proportional to the damping factor, both of which contribute to defining a response of the microactuator to an application of a step stress.

In particular, a microactuator of silicon typically has a quality factor which is too high (comprised, e.g., between 10 and 1000) for the considered applications (e.g., with too low a damping factor comprised, e.g., between $5.10^{-4}$ and $5.10^{-2}$), and thus has a step response having over-elongations of a very high amplitude compared with a stationary value.

Consequently, during fine position control of the R/W transducer 6 that determines accurate positioning of the R/W transducer 6 at a read position, microactuators of silicon have the disadvantage of having rather high settling oscillations (e.g., "ringing") about the read position, such as to require the use of very complex closed-loop control circuits for damping such settling oscillations and thus to enable acceptable settling times of the R/W transducer 6.

SUMMARY OF THE INVENTION

An advantage of an embodiment of the present invention is to provide an integrated microactuator to address disadvantages of known integrated microactuators.

An embodiment of the present invention provides an integrated microactuator comprising a stator element and a rotor element capacitively coupled. The rotor element comprises a suspended mass and a plurality of movable drive arms extending from the suspended mass and biased at a reference potential. The stator element comprises a plurality of first fixed drive arms facing respective movable drive arms and biased at a first drive potential. A mechanical damping structure for settling oscillations of the rotor element is interposed between at least a part of the stator element and a part of the rotor element.

BRIEF DESCRIPTION OF THE DRAWINGS

For an understanding of the present invention two illustrative embodiments will now be described, purely by way of non-exhaustive and non-limiting examples, with reference to the accompanying drawings.

DETAILED DESCRIPTION OF THE ILLUSTRATED EMBODIMENTS

Figure 1:
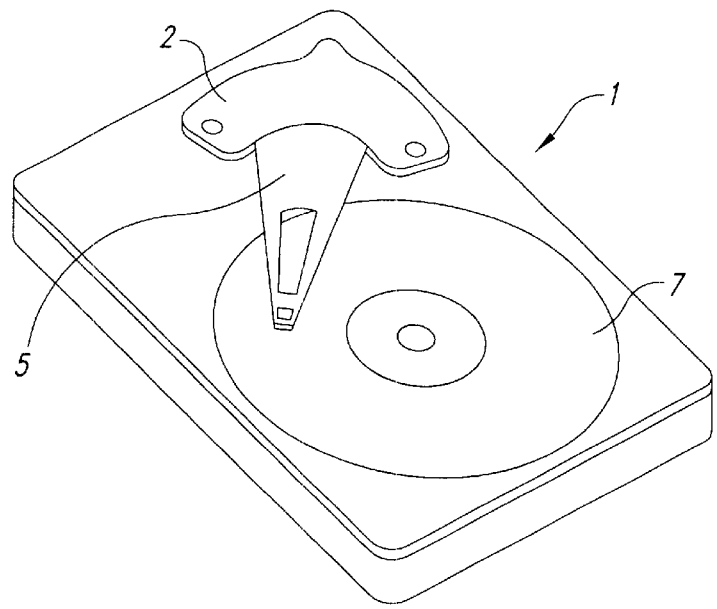
FIG. 1 is a perspective view of a hard disk actuating device of a known type.
Figure 2:
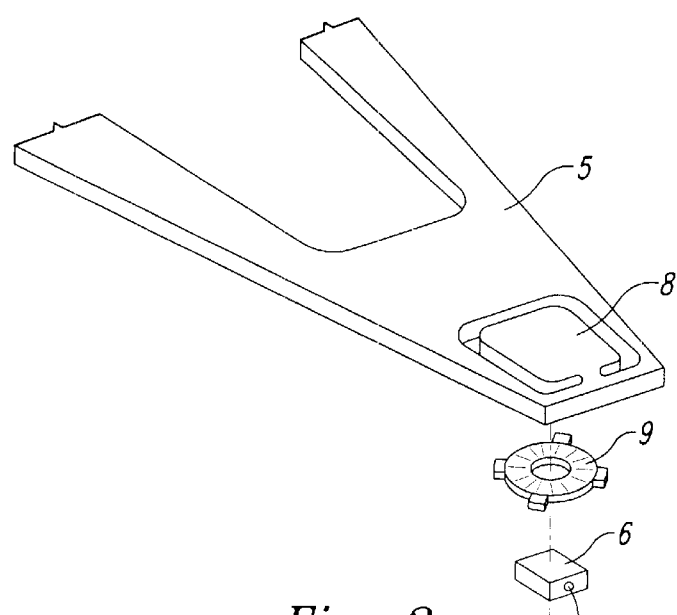
FIG. 2 is an exploded view of a micrometric actuation assembly of the actuating device of FIG. 1.
Figure 3:
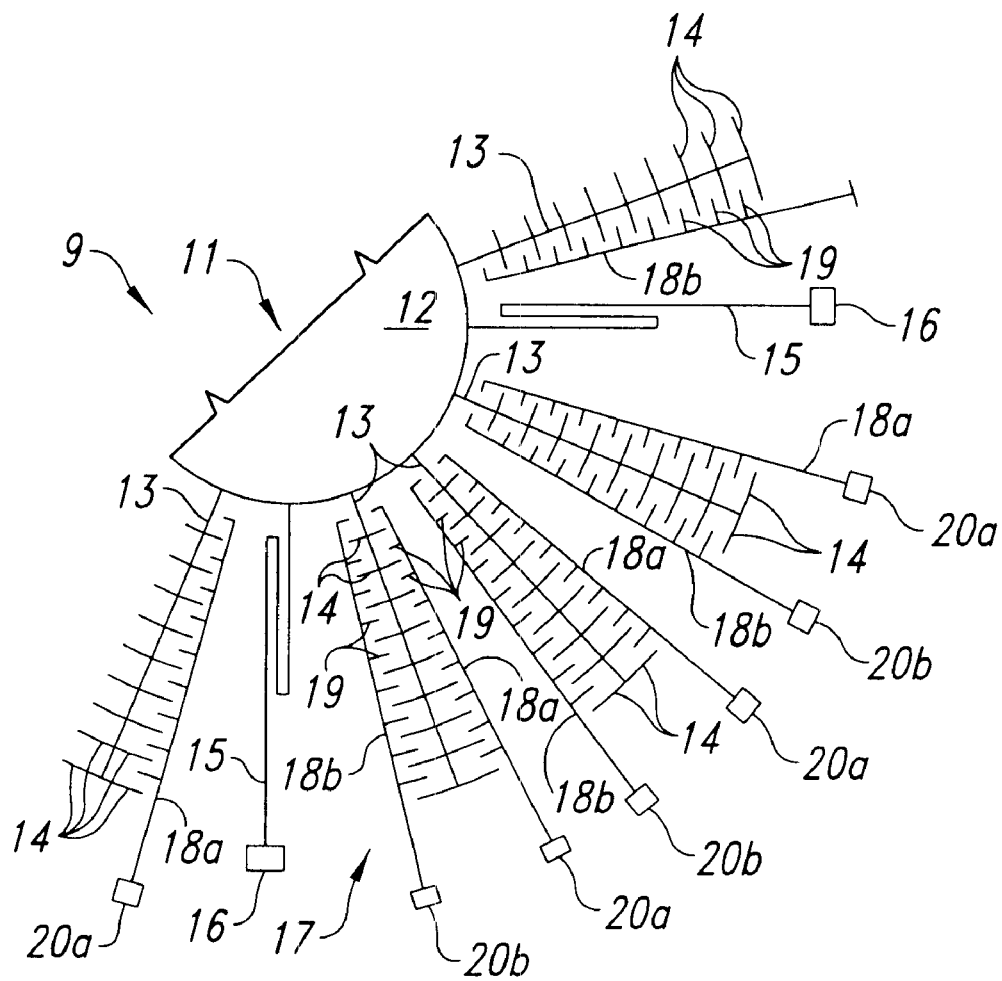
FIG. 3 is a diagrammatic view of an integrated microactuator of a known type.
Figure 4:
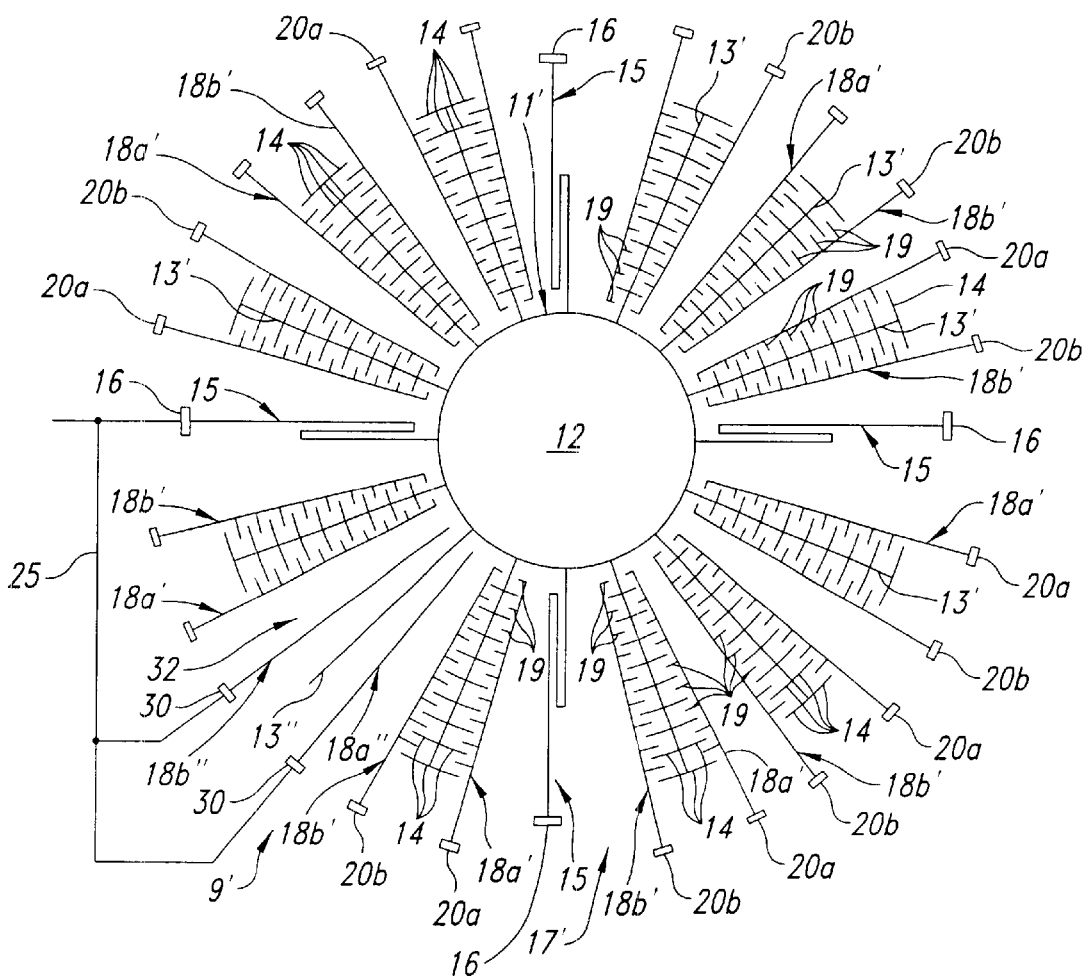
FIG. 4 is a diagrammatic view of an integrated microactuator according to a first embodiment of the present invention.

In FIG. 4, 9' denotes as a whole an integrated microactuator of a rotary type according to a first embodiment of the present invention. Microactuator 9' has a similar general structure as the microactuator 9 of FIG. 3. Therefore, parts similar or corresponding to those of microactuator 9 are denoted in FIG. 4 with the same reference numerals as those in microactuator 9.

The microactuator 9' differs from microactuator 9 in that not all the fixed arms of the stator (denoted here at 17') are connected to bias regions 20a and 20b, but two fixed arms (hereinafter called "fixed damping arms" and denoted at 18a" and 18b") are connected to a fixed bias region 30 biased at the same reference potential as the rotor (denoted here at 11'), as shown diagrammatically in FIG. 4 by the connection 25. The remaining fixed arms (hereinafter called "fixed drive arms" and denoted at 18a' and 18b') are still respectively connected to bias regions 20a and 20b and are respectively biased at the first and the second drive potentials.

Consequently, the movable arm of rotor 11' arranged between the fixed damping arms 18a" and 18b" defines a movable damping arm (denoted at 13"), whereas the remaining movable arms arranged between the fixed drive arms 18a' and 18b' define movable drive arms (denoted at 13'). In the microactuator 9', neither the fixed damping arms 18a" and 18b" nor the movable damping arm 13" have electrodes interleaved between them in a comblike manner.

By virtue of the separation of the fixed arms 18a, 18b into fixed drive arms 18a', 18b' and fixed damping arms 18a", 18b" and of the movable arms 13 into movable drive arms 13' and movable damping arms 13", the fixed drive arms 18a', 18b' and the respective movable drive arms 13' are dedicated to generating the rotary movement of rotor 11, whereas the fixed damping arms 18a", 18b" and the movable damping arm 13", all set at the same reference potential, perform a passive role as regards to generation of rotary movement and define as a whole a damping structure (denoted in the illustration at 32) for the settling oscillations of rotor 11'. In fact, during the rotary movement of rotor 11', the movable damping arm 13" causes, with the adjacent fixed damping arms 18a", 18b", the air present between them to be compressed and to considerably reduce the angular movement of rotor 11 beyond the read position and the settling oscillations which derive therefrom.

In microactuator 9' according to an embodiment of the present invention, damping is proportional to an inverse of the cube of an average distance between fixed damping arms 18a", 18b" and respective movable damping arm 13". Consequently, although FIG. 4 shows only one damping structure 32, microactuator 9' can be designed to have a number of damping structures 32 which depends on a value of a microactuator intrinsic damping factor (e.g., on an inherent value in the absence of damping structure(s) 32) and on the desired value of the damping factor.

In particular, from systems theory, a damping factor of $1/\sqrt{2}=0.707$, corresponding to a quality factor also equal to 0.707, enables an optimum compromise to be reached between bandwidth and over-elongations. Therefore, in microactuator 9' according to an embodiment of the present invention, the number of damping structures 32 is conveniently selected to cause the damping coefficient of microactuator 9' to assume values in a predetermined range about the above-mentioned optimum value of 0.707, comprised, e.g., between 0.6 and 0.8. The use of damping structures 32 of the above-described type thus enables microactuators to have optimum damping factors, and therefore reduced settling oscillations about the read position.

Consequently, this involves not only a considerable reduction of the settling times of the microactuators, and a consequent increase in the performance of the microactuators, but also a considerable simplification of closed-loop control circuits previously dedicated to damping the settling oscillations. Therefore, a considerable reduction in the area of silicon occupied by such control circuits results.

Figure 5:
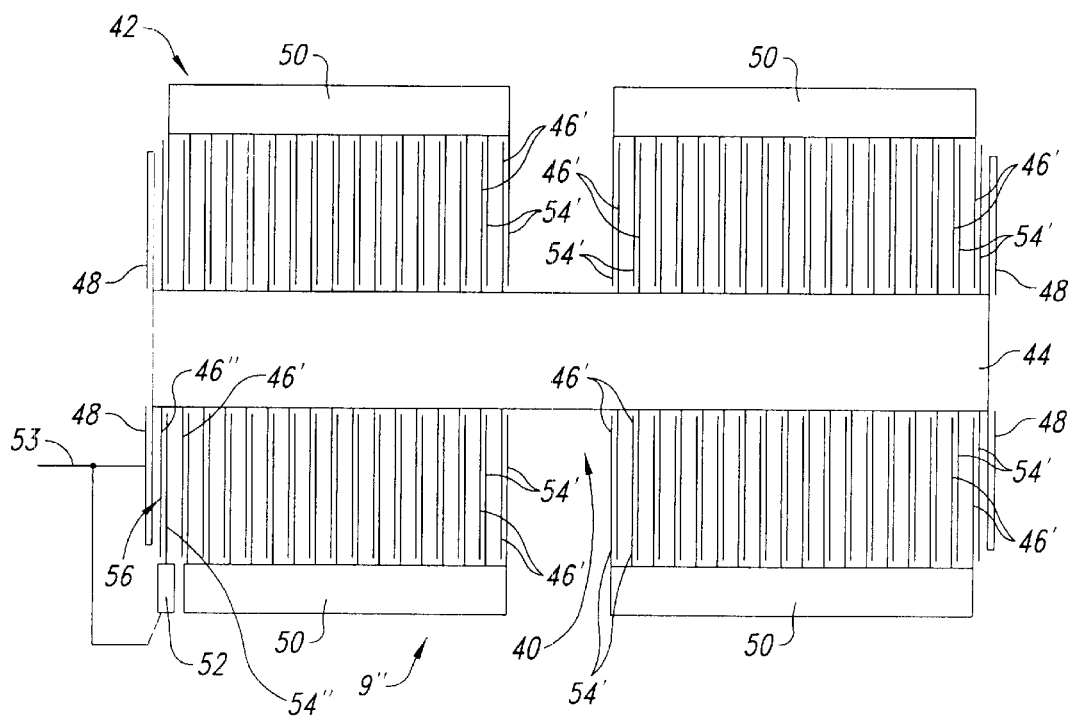
FIG. 5 is a diagrammatic view of an integrated microactuator according to a second embodiment of the present invention.

FIG. 5 shows a microactuator of a linear type according to a second embodiment of the present invention. The microactuator (denoted at 9") comprises a rotor 40 biased at the reference potential and a stator 42 coupled capacitively to the rotor 40.

Rotor 40 comprises a suspended mass 44 of rectangular shape, a plurality of movable drive arms 46' and a movable damping arm 46" extending from the suspended mass 44 perpendicular to the larger sides of the suspended mass 44. In the example shown in FIG. 5, the movable drive arms 46' and movable damping arm 46" define four groups of movable arms disposed in pairs on respective larger sides of the suspended mass 44. Rotor 40 further comprises elastic suspension and anchoring elements 48 extending from two opposite ends of the suspended mass 44 for supporting and biasing rotor 40 at the reference potential.

Stator 42 comprises four fixed bias regions 50 of rectangular shape and parallel to the suspended mass 44, biased in couples at a respective drive potential, each arranged facing a respective group of movable drive arms 46' and having a plurality of fixed drive arms 54'. Stator 42 further comprises a further fixed bias region 52, arranged alongside one of the bias regions 50 and biased at the same reference potential of rotor 40, a as shown schematically by the connection line 53. A fixed damping arm 54" further extends from the last bias region 52 towards the suspended mass 44.

The fixed drive arms 54' and fixed damping arm 54" extend parallel to each other and to the movable drive arms 46' and movable damping arm 46". The fixed drive arms 54' are each arranged facing a respective movable drive arm 46', and the fixed damping arm 54" is arranged facing the movable damping arm 46".

Analogous to microactuator 9', the fixed drive arms 54' and the respective movable drive arms 46' in microactuator 9" are dedicated to generating the linear movement of rotor 40, whereas fixed damping arm 54" and movable damping arm 46", both at the same reference potential, perform a passive role with respect to the generation of the translational movement and define in their entirety a settling oscillation damping structure (denoted at 56 in FIG. 5) of rotor 40 operating on the principle of air compression in the manner described above. For this embodiment also, the number of oscillation damping structures 56 is selected on the basis of the inherent damping value of microactuator 9". Typically, the oscillation damping structure 56 is replicated on the other three quadrants of the rotor 40, for reasons of symmetry and uniformity of movement.

Finally, it will be clear that modifications and variants may be introduced to the microactuators 9' and 9" described and illustrated herein without departing from the scope of the present invention. For example, fixed damping arms 18a" and 18b" and movable drive arm 13" of microactuator 9' could also be equipped with respective fixed and movable electrodes similar to electrodes 19, 14 (see, e.g., FIG. 4), even though the above-described microactuators 9' and 9" enable damping structures 32, 56 having a more efficient damping effect and a smaller bulk. In fact, while in the above-described microactuators 9' and 9", the damping effect is proportional to the inverse of the cube of the average distance between fixed damping arms 18a", 18b", 54" and respective movable damping arms 13", 46", the damping effect is proportional only to the inverse of the average distance in microactuators having damping arms with interleaved electrodes.

Furthermore, although damping structures according to an embodiment of the invention is particularly useful in cases of microactuators of semiconductor material (e.g., single and multi-crystal silicon), they may also be produced in metal microactuators whenever it is desired to improve their damping characteristics. Finally, any damping it structure may comprise two movable damping arms laterally surrounding a single fixed damping arm, in a manner opposite to that shown in FIG. 4, or a plurality of fixed arms and movable arms, in equal or different numbers.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. The teachings provided herein of embodiments of the invention can be applied to other microactuator systems.

In general, in the following claims, the terms used should not be construed to limit the invention to the specific embodiments disclosed in the specification and the claims, but should be construed to include all microactuator systems that operate under the claims to provide a damping structure. Accordingly, the invention is not limited by the disclosure, but instead the scope of the invention is to be determined entirely by the following claims, which are to be construed in accordance with established doctrines of claim interpretation.

What is claimed is:

1. An integrated microactuator comprising a stator element and a rotor element capacitively coupled, said rotor element comprising a suspended mass and a plurality of movable drive arms extending from said suspended mass and biased at a reference potential, and said stator element comprising at least a plurality of first fixed drive arms facing respective said movable drive arms and biased at a first drive potential, wherein a mechanical damping structure for settling oscillations of said rotor element interposed between at least a part of said stator element and a part of said rotor element, and wherein said mechanical damping structure is biased at said reference potential and wherein said mechanical damping structure comprises at least one movable damping arm extending from said suspended mass and at least one first fixed damping arm facing said movable damping arm and biased at said reference potential.

2. The microactuator according to claim 1 wherein said stator element further comprises a plurality of second fixed drive arms associated with respective said movable drive arms and biased at a second drive potential, each movable drive arm being interposed between a respective said first fixed drive arm and a respective said second fixed drive arm and wherein said mechanical damping structure further comprises a second fixed damping arm associated with said movable damping arm and biased at said reference potential, said movable damping arm being interposed between said first and second fixed damping arm.

3. The microactuator according to claim 1 wherein said movable damping arm and said first fixed damping arm have no reciprocally interleaved transverse structures.

4. The microactuator according to claim 1 wherein the microactuator comprises a semiconductor material.

5. The microactuator according to claim 1 wherein the microactuator comprises a metallic material.

6. The microactuator according to claim 1 wherein the microactuator comprises a rotary microactuator.

7. The microactuator according to claim 1 wherein the microactuator comprises a linear-translational microactuator.

8. An integrated microactuator for hard disk drives, the microactuator comprising:
    a stator element having a plurality of first arms extending therefrom, the first arms being biased at a first potential;
    a rotor element having a suspended mass and capacitively coupled to the stator element, the suspended mass having a plurality of second arms extending there from the second arms being biased at a second potential; and
    a damping structure interposed between two of the plurality of first arms, the rotor element moving with respect to the stator element in response to a potential difference between the first and second potentials, wherein the damping structure dampens setting oscillations of the rotor element, wherein the damping structure comprises:
    a first damping arm extending from the suspended mass and having a first plurality of electrodes; and
    a second damping arm facing the first damping arm and having a second plurality of electrodes, the second damping arm being biased at the second potential, the first plurality of electrodes being interleaved with the second plurality of electrodes.

9. The microactuator of claim 8 wherein the microactuator comprises a rotary microactuator or a linear microactuator.

10. An integrated microactuator for hard disks, the microactuator comprising:
    a stator element having a plurality of first arms extending therefrom, the first arms being biased at a first potential;
    a rotor element having a suspended mass and capacitively coupled to the stator element, the suspended mass having a plurality of second arms extending therefrom, the second arms being biased at a second potential; and
    a damping structure having a first damping arm extending from the suspended mass and a second damping arm facing the first damping arm, the second damping arm being biased at the second potential, the rotor element moving with respect to the stator element in response to a potential difference between the first and second potentials, wherein the damping structure dampens settling oscillations of the rotor element.

11. An integrated microactuator for hard disk drives, the microactuator comprising:

a stator element having a plurality of first arms extending therefrom, the first arms being biased at a first potential;

a rotor element having a suspended mass and capacitively coupled to the stator element, the suspended mass having a plurality of second arms extending therefrom, the second arms being biased at a second potential;

a pair of fixed damping arms; and a movable damping arm extending from the suspended mass and interposed between the fixed damping arms, the fixed damping arms being biased at the second potential.

12. An actuating system for a hard disk drive, the system comprising:

a motor coupled to a suspension structure;

a read/write transducer; and a microactuator interposed between the suspension structure and the transducer, the microactuator comprising:

a stator element having a plurality of first arms extending therefrom, the first arms being biased at a first potential;

a rotor element having a suspended mass and capacitively coupled to the stator element, the suspended mass having a plurality of second arms extending therefrom, the second arms being biased at a second potential; and a damping structure, including a first damping arm extending from the suspended mass and a second damping arm facing the first damping arm, the second damping arm being biased at the second potential, the damping structure being interposed between a region of the stator element and a region of the rotor element, the rotor element moving with respect to the stator element in response to a potential difference between the first and second potentials, wherein the damping structure dampens settling oscillations of the rotor element.

13. The system of claim 12 wherein the microactuator comprises a rotary microactuator or a linear microactuator.

14. An integrated microactuator, comprising:

a stator element having a plurality of fixed drive arms biased at a first potential;

a rotor element having a plurality of movable drive arms biased at a second potential, the plurality of movable drive arms facing and interleaved with the plurality of fixed drive arms;

a movable damping arm affixed to the rotor, and biased at the second potential; and a fixed damping arm facing and proximate to the movable damping arm, and biased at the second potential.

15. The integrated microactuator of claim 14 wherein:

the fixed damping arm is one of a plurality of fixed damping arms biased at the second potential;

the movable damping arm is one of a plurality of movable damping arms biased at the second potential and affixed to the rotor; and the movable damping arms face and are interleaved with the fixed damping arms.

* * * * *

UNITED STATES PATENT AND TRADEMARK OFFICE
CERTIFICATE OF CORRECTION

PATENT NO.    : 6,404,599 B1
DATED         : June 11, 2002
INVENTOR(S)   : Benedetto Vigna It is certified that error appears in the above-identified patent and that said Letters Patent is hereby corrected as shown below:

Column 6,
Lines 39 and 40, "second arms extending there from the second arms being biased" should read as -- second arms extending therefrom, the second arms being biased --.

Signed and Sealed this

Seventh Day of January, 2003

JAMES E. ROGAN
*Director of the United States Patent and Trademark Office*